United States Patent [19]
Sato

[11] Patent Number: 4,839,615
[45] Date of Patent: Jun. 13, 1989

[54] FREQUENCY MODULATING CIRCUIT FOR VIDEO TAPE RECORDER

[75] Inventor: Ichitaro Sato, Kanagawa, Japan
[73] Assignee: Sony Corporation, Tokyo, Japan
[21] Appl. No.: 145,330
[22] Filed: Jan. 19, 1988
[30] Foreign Application Priority Data
    Jan. 27, 1987 [JP] Japan ................. 62-018095
[51] Int. Cl.⁴ ............................................... H04N 9/80
[52] U.S. Cl. ......................................... 332/18; 358/330; 360/30
[58] Field of Search ............... 332/18; 358/315, 330; 360/30, 33.1

[56] References Cited
U.S. PATENT DOCUMENTS

4,052,740 10/1977 Coleman, Jr. .................. 358/330 X
4,165,518 8/1979 Hirai ............................... 360/30 X

*Primary Examiner*—Siegfried H. Grimm
*Attorney, Agent, or Firm*—Hill, Van Santen, Steadman & Simpson

[57] ABSTRACT

A frequency modulating circuit comprising a circuit for separating a synchronizing signal from an input signal, a circuit for generating a sampling pulse in accordance with the synchronizing signal, a circuit for producing a frequency modulated signal out of the input signal, and a circuit for detecting the phase of the frequency modulated signal at the timing of the sampling pulse. The level of the input signal is corrected in accordance with the output of the detecting circuit, so that the phase of the frequency modulated signal is locked to a predetermined phase at the timing of the sampling pulse. Consequently, despite frequency modulation of the wide-band input signal, the invention is capable of preventing occurrence of any moire pattern that may otherwise be caused in displaying the demodulated signal.

6 Claims, 5 Drawing Sheets

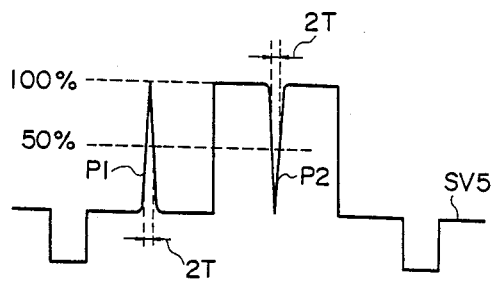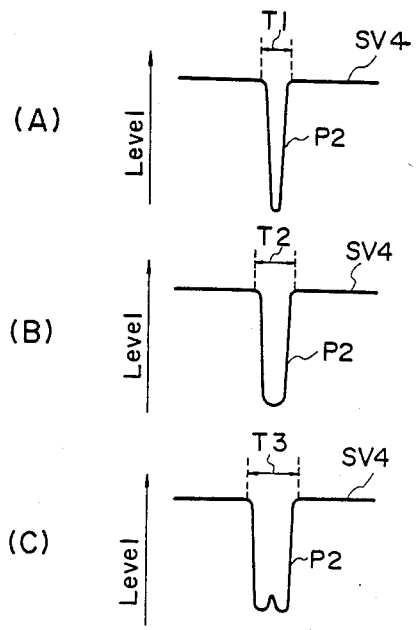

FREQUENCY MODULATING CIRCUIT FOR VIDEO TAPE RECORDER

BACKGROUND OF THE INVENTION:

1. Field of the Invention

The present invention generally relates to a frequency modulating circuit and, more particularly, to a circuit adapted for use in a video tape recorder (VTR) which magnetically records video signals.

2. Description of the Prior Art

In the conventional video tape recorder known heretofore, a video signal or a luminance signal extracted therefrom is magnetically recorded through frequency modulation.

As shown in FIG. 1, a video signal SV is fed to a synchronizing signal separating circuit 2, which then produces a gate signal SP1 rising at a predetermined timing.

In response to the gate pulse SP1, a clamp circuit 3 clamps the video signal SV in such a manner that a sync-tip level thereof becomes equal to a predetermined signal level.

A preemphasis circuit 4 emphasizes a high-range component of the video signal SV1 outputted from the clamp circuit 3, so as to prevent deterioration of the signal-to-noise ratio of the video signal in a recording reproduction mode. And a video signal SV2 produced with overshoot and undershoot as a result of such emphasis is outputted via a white clip circuit 5 and a dark clip circuit 6 to a modulating circuit 7.

The white clip circuit 5 and the dark clip circuit 6 serve to clip the video signal SV2 at predetermined white and dark signal levels respectively so that a frequency modulated signal SFV obtained via the modulating circuit 7 may not be overmodulated due to the overshoot and undershoot of the video signal SV2 beyond desired signal levels.

Thus the video signal SFV modulated at a predetermined frequency can be obtained via the modulating circuit 7 and then is outputted via an amplifying circuit to a magnetic head, whereby the video signal can be recorded on a magnetic tape.

However, in the video tape recorder of the type mentioned, the level of the reproduced signal is lowered with increase of the frequency magnetically recorded, so that the carrier frequency of the FM video signal SFV needs to be set at a low frequency close to the frequency band of the premodulation video signal SV2.

Therefore in the demodulating circuit, as shown in FIGS. 2 and 3, the FM video signal SFV modulated by a predetermined carrier frequency fm and obtained via the magnetic head is doubled to produce an FM video signal SFV2 modulated by a double carrier frequency 2fm. And from a sum signal of such video signal SFV2 and a demodulated video signal SV3, the latter signal SV3 alone is extracted via a low-pass filter circuit so that the FM video signal SFV is not mixed with the demodulated video signal SV3.

In the video tape recorder of the above type, however, there exists a problem that when the band of the video signal SV to be recorded is widened for the purpose of enhancing the reproduced picture quality, as shown in FIG. 4, the band of the demodulated video signal SV4 also becomes wider to eventually bring about a disadvantage that the high range of the video signal SV4 overlaps the low range of the video signal SFV2 modulated by the double carrier frequency 2fm.

Due to such mutual overlap of the bands, it becomes difficult to attain complete separation into the video signal SV4 and the frequency modulated video signal SFV2, and accordingly the sideband component of the video signal SVF2 is partially mixed into the video signal SV4 obtained via the low-pass filter circuit.

Consequently, in modulation of a video signal SV5 where an inverse 2T pulse P2 of a signal level varying inversely is superposed on a 2T pulse P1 whose half-amplitude level corresponds to a duration of 2T, as shown in FIG. 5, the inverse 2T pulse has a frequency of 5 MHz or so which is extremely close to the modulation carrier frequency. However, in the demodulated video signal SV4 shown in enlarged views of FIG. 6, there occur variations in the pulse durations T1, T2 and T3 of the inverse 2T pulse P2 (FIG. 6 (A), (B) and (C)) in accordance with the phase of the FM video signal SFV relative to the inverse 2T pulse P2, whereby the rise and fall instants of the inverse 2T pulse P2 are also varied. In case the frequency component of the video signal is considerably different from the modulation carrier frequency, many carrier waves are existent per pulse of the video signal so that, despite a slight phase deviation, the video signal can be reproduced with high fidelity by frequency modulation. However, in the above example where the video signal has an extremely narrow pulse duration such as the inverse 2T pulse, the number of the carrier waves per pulse is so small that even a slight phase deviation causes marked deterioration in the reproducibility of the original video signal.

If the rise and fall instants are varied in accordance with the phase of the FM video signal SFV in an exemplary case of a reproduced picture where a dark vertical line is displayed on a white background, it signifies that the horizontal display positions of the rise and fall portions of such dark vertical line are varied in accordance with the phase of the FM video signal SFV. Therefore, when the signal phase is varied per line of the displayed picture, the edge position of the vertical line is also varied in accordance with such phase variation.

Consequently, if the variation per line is periodically changed in synchronism with the display of each field, it causes distortion in the display with the dark vertical line becoming thicker or thinner. To the contrary, if the phase variation per line fails to be synchronous with the display of each field, the portion rendered thicker or thinner correspondingly to the synchronism error is shifted upward or downward to eventually induce a moire pattern on the display screen.

Practically the carrier frequency always has a slight drift in the modulating circuit 7, and occurrence of such moire pattern is unavoidable in the displayed picture if the band of the video signal SV4 is wide. Thus, there has been a problem heretofore that the deterioration caused in the reproduced picture quality by such moire pattern brings about a greater disadvantage as compared with the improvement attained in the reproduced picture quality by widening the band of the video signal SV.

For solving the problem mentioned, there may be contrived a method which sets low levels to limit the white and dark signals respectively in the white clip circuit 5 and the dark clip circuit 6 so as not to widen the sideband of the FM video signal SFV.

In this case, the sideband of the FM video signal SFV2 obtained by doubling the modulation frequency is also rendered narrower correspondingly, whereby the sideband component mixed into the demodulated video signal SV4 can be reduced.

Meanwhile, if the amplitude of the predetermined video signal SV2 is limited by lowering the respective signal levels of the white and dark clip circuits, there arises another problem that a waveform distortion is induced in the video signal obtained by deemphasizing the demodulated video signal SV4.

There may be contrived another method which increases the modulation carrier frequency fm to avert an overlap between he band of the doubled video signal SFV2 and the demodulated video signal SV4. But still some difficulties are existent in practical use since the signal-to-noise ratio in the high range of the reproduced signal is deteriorated with increase of the carrier frequency fm.

SUMMARY OF THE INVENTION

Accordingly, it is an object of the present invention to provide an improved frequency modulating circuit for use in a video tape recorder.

Another object of the present invention is to provide a frequency modulating circuit whose output signal is recorded, reproduced and demodulated without causing occurrence of any moire pattern in the reproduced picture.

And a further object of the present invention is to provide a frequency modulating circuit in which the bandwidth of an input video signal can be selected broad.

According to an aspect of the present invention, the modulating circuit comprises a synchronizing signal separating circuit for separating a synchronizing signal from an input video signal, a sampling pulse generating circuit for generating a sampling pulse in accordance with the synchronizing signal, a modulating circuit for producing a frequency modulated signal out of the input video signal, and a detecting circuit for detecting the phase of the frequency modulated signal at the timing of the sampling pulse. The input signal level is corrected in accordance with the result of detection obtained from the detecting circuit, so that the phase of the frequency modulated signal is locked to a predetermined phase at the timing of the sampling pulse.

Since the phase of the frequency modulated signal is locked to a predetermined phase at the timing of each sampling pulse repeated in synchronism with the synchronizing signal, it becomes possible to minimize the carrier frequency drift in the frequency modulated signal.

Even if the band of the input signal is widened for achieving the above function, occurrence of any moire pattern can be prevented due to the minimized drift of the carrier frequency.

BRIEF DESCRIPTION OF THE DRAWINGS

FIGS. 5 and 6 show signal waveforms for explaining the operation in the conventional circuit of FIG. 1;

DETAILED DESCRIPTION OF THE PREFERRED EMBODIMENT

Hereinafter a preferred embodiment of the present invention will be described in detail with reference to the accompanying drawings.

Figure 1:
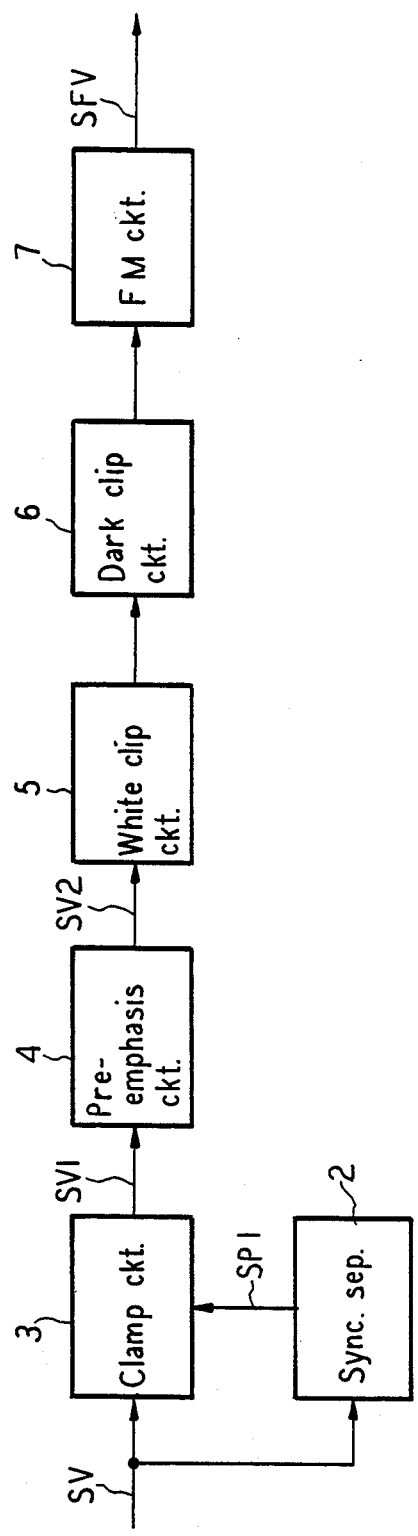
FIG. 1 is a block diagram of a conventional frequency modulating circuit.
Figure 2:
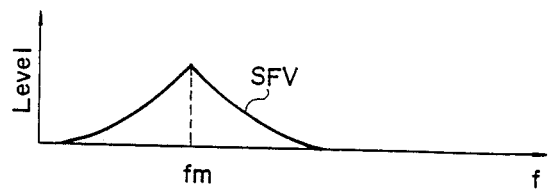
FIGS. 2, 3 and 4 graphically represent characteristic curves for explaining the operation in the conventional circuit of FIG. 1.
Figure 3:
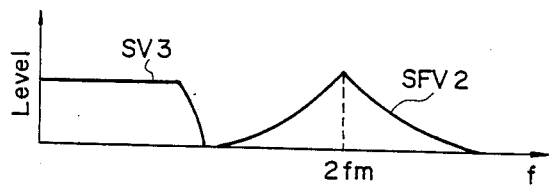
Figure 4:
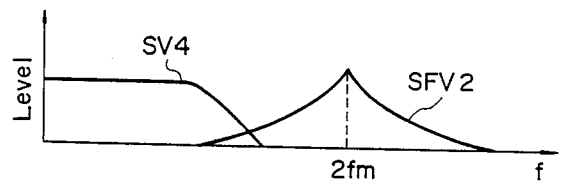
Figure 7:
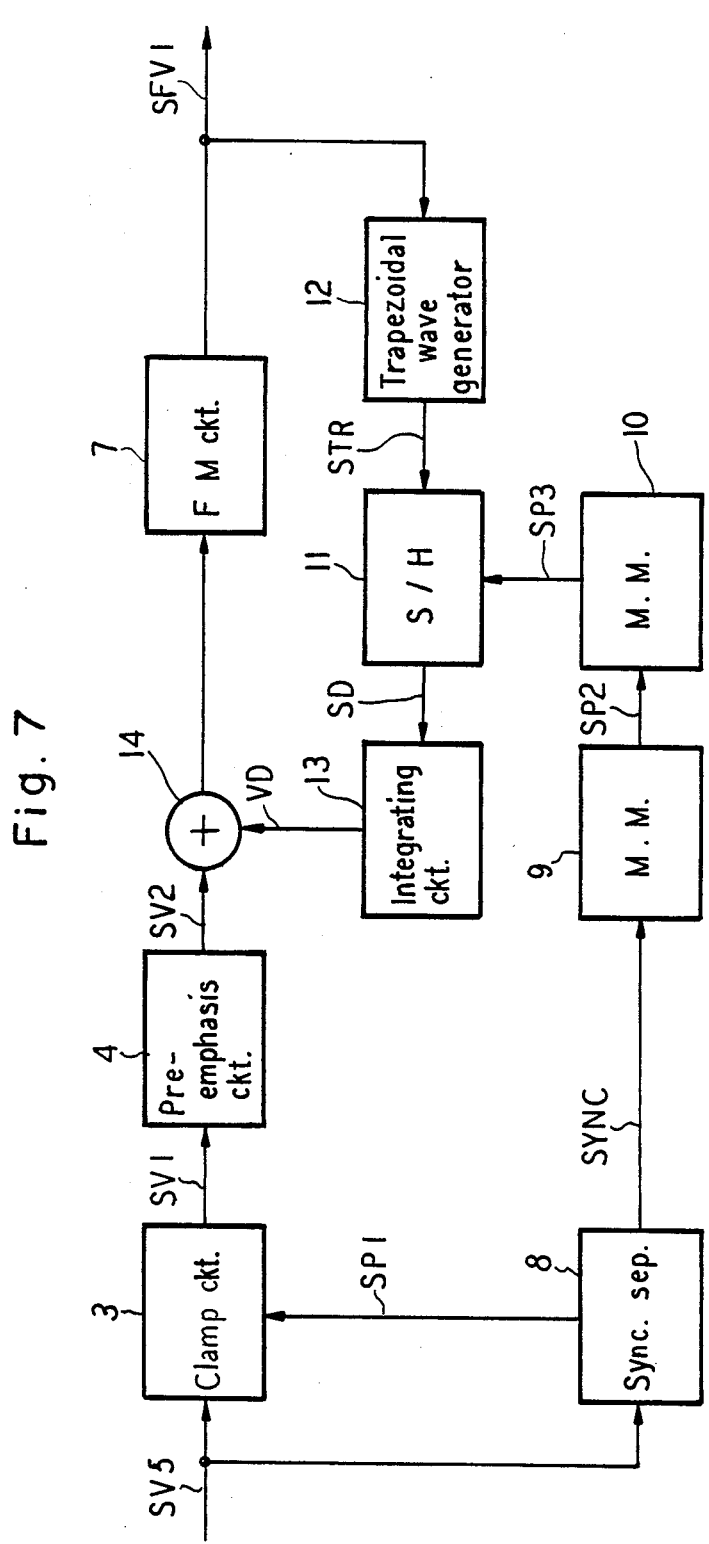
FIG. 7 is a block diagram of a frequency modulating circuit embodying the present invention.
Figure 8:
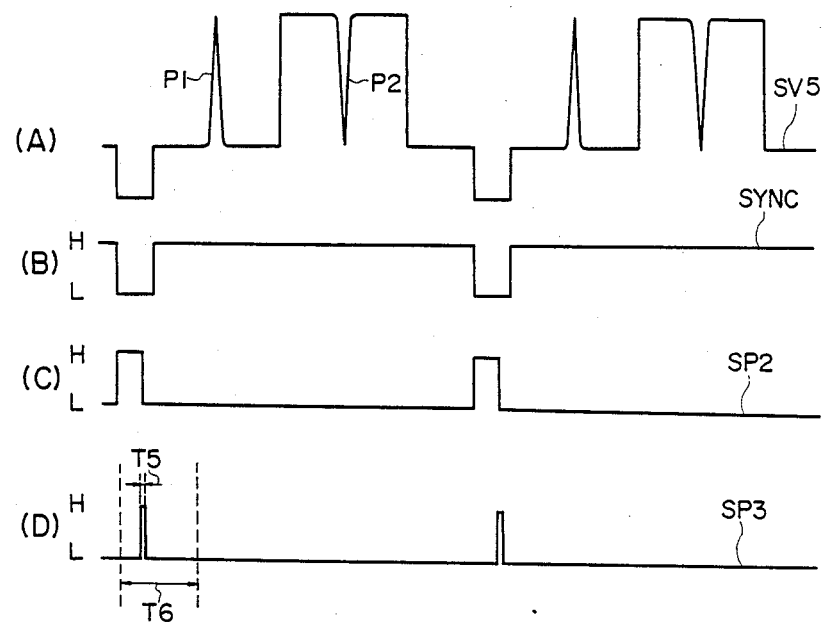
FIGS. 8 and 9 show signal waveforms for explaining the operation in the embodiment of FIG. 7.

In FIG. 7 where components corresponding to those shown in FIG. 1 are denoted by like reference numerals and symbols, a synchronizing signal separating circuit 8 outputs a gate pulse SP1 to a clamp circuit 3 while outputting to a monostable multivibrator 9 a synchronizing signal SYNC (FIG. 8 (B)) separated from a video signal SV5 (FIG. 8 (A)) as shown in FIG. 8.

The monostable multivibrator 9 produces a timing pulse SP2 (FIG. 8 (C)) whose logic level rises at the fall timing of the synchronizing signal SYNC and falls at a predetermined timing in the duration of the logic level "L" of the synchronizing signal SYNC.

In response to the timing pulse SP2, another monostable multivibrator 10 outputs to a sampling hold circuit 11 a sampling pulse SP3 (FIG. 8 (D)) which has a pulse duration of T5 (on the order of 10 nsec) and rises at the fall timing of the timing pulse SP2 (i.e., its logic level rises during a sync-tip portion of a logic level "L" in the horizontal synchronizing signal SYNC).

Thus, the monostable multivibrators 9 and 10 constitute a sampling pulse generating circuit which generates a sampling pulse SP3 in accordance with the synchronizing signal SYNC.

Figure 9:
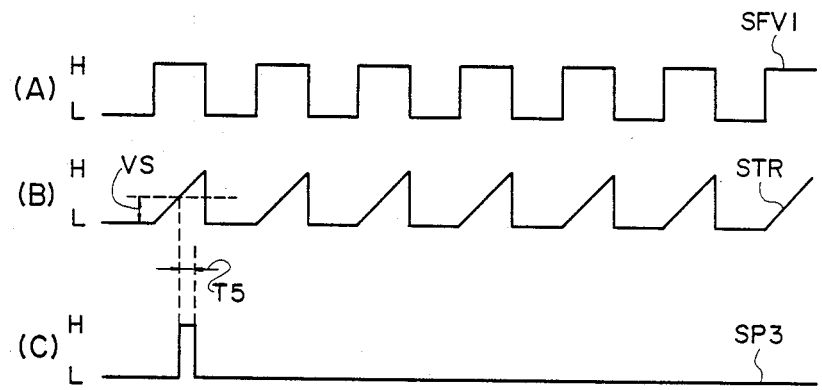

As shown in an enlarged waveform chart of FIG. 9 representing a rise duration T5 of the sampling pulse SP3 in FIG. 8 and a duration T6 anterior and posterior thereto, the sampling hold circuit 11 receives via a trapezoidal wave generating circuit 12 a trapezoidal wave signal STR rising with a predetermined time constant from the rise timing of the FM video signal SFV1 (FIG. 9 (A)) and falling at the fall timing of the video signal SFV1, and samples and holds the voltage VS of the trapezoidal wave signal STR at the rise timing of the sampling pulse SP3 (FIG. 9 (C)).

Therefore, the phase of the FM video signal SFV1 can be detected at the rise timing of the sampling pulse SP3 via the sampling hold circuit 11.

Since the rise timing of the sampling pulse SP3 is set to be during the logic level "L" of the synchronizing signal SYNC, the phase of the FM signal SFV1 during the sync-tip portion of the video signal SV4 can be detected in accordance with the detection signal SD obtained from the sampling hold circuit 11.

An integrating circuit 13 integrates the detection signal SD and feeds the resultant DC voltage VD to an adder circuit 14 for adding such voltage to the preemphasized video signal SV2.

Consequently, the phase of the video signal SFV1 obtained via the frequency modulating circuit 7 is detected at the predetermined rise timing of the sampling pulse SP3 per line of the displayed picture, and the phase of the FM signal SFV1 during the sync-tip portion is locked to a predetermined phase in accordance with the result of such detection.

If the phase during the sync-tip portion is locked per line, it is possible in the modulating circuit 7 to maintain the carrier frequency drift within a sufficiently small value in practical use during the period of each line.

Therefore, even in case the band of the video signal SV4 is selected to be wide and the sideband component of the FM video signal SFV2 modulated by the double carrier frequency 2fm is mixed into the demodulated video signal SV4, it is still possible to prevent, in the video signal with a dark vertical line displayed on a white background for example, the variation of the carrier frequency phase per line that may otherwise be induced at the rise and fall instants of the dark vertical line.

Since the carrier frequency phase at the rise and fall instants of the dark vertical line can be locked to a predetermined phase, the horizontal display positions of the rise and fall portions in the dark vertical line can be locked to predetermined positions in the reproduced picture.

Thus, an improved frequency modulating circuit is achievable with a simplified constitution which is capable of preventing occurrence of any moire pattern even if the band of the video signal is selected to be wide, and is further capable of averting an unsatisfactory display with such dark vertical line becoming thicker or thinner.

According to the embodiment mentioned above, it is possible to prevent, in recording a frequency modulated wide-band video signal, occurrence of any moire pattern in the reproduced picture as well as to prevent an unsatisfactory display of an edge portion in a dark vertical line or the like.

Although the description given above on the embodiment is concerned with an exemplary case of outputting a sampling pulse at a predetermined timing, the present invention is not limited to such example alone and may be so modified as to vary the time constant of the monostable multivibrator 9. In this case, the rise timing of the sampling pulse is settable at any desired timing.

In such modification, relative to a demodulated video signal for example, an inverse 2T pulse of a desired signal waveform can be obtained during the period between FIG. 6 (A) and (C) in compliance with the rise timing of the sampling pulse.

Therefore, the signal waveform at a desired position of the displayed picture can be corrected by adjusting the rise timing of the sampling pulse.

In addition to the above embodiment where the phase of the FM signal SFV1 during the sync-tip portion is locked to a predetermined phase, the constitution may be so modified that the phase of the FM signal during a front porch or a back porch of the synchronizing signal in the video signal is locked to a predetermined phase. Essentially, the requisite is to lock the phase of the FM signal during the period in which a fixed signal level is obtained repeatedly in the input signal at a predetermined timing.

Although a description has been given hereinabove with regard to the frequency modulation of a video signal performed by the use of the present invention, it is to be understood that the present invention is not limited to such embodiment alone and may also be applied to some other frequency modulating circuit in a video tape recorder where, for example, a chrominance signal converted to a lower frequency band is recorded together with a frequency modulated luminance signal.

Thus, in the frequency modulating circuit of the present invention where the phase of a frequency modulated signal is locked to a predetermined phase at a predetermined timing, occurrence of any moire pattern can be prevented in the displayed picture despite modulation of a wide-band input signal.

What is claimed is:

1. A frequency modulating circuit for use in a video tape recorder, comprising:
   input terminal means supplied with a video signal to be recorded;
   clamp circuit means for clamping a predetermined portion of said video signal to a reference level;
   synchronizing signal separating means for separating a horizontal synchronizing signal from said video signal;
   sampling pulse generating means for generating a sampling pulse in accordance with said horizontal synchronizing signal;
   modulating means for modulating the frequency of a carrier signal by the output signal of said clamp circuit means and thereby generating a frequency modulated signal;
   detecting means for detecting the phase of said frequency modulated signal at the timing of said sampling pulse; and
   correcting means for correcting the level of the output signal of said clamp circuit means by the output of said detecting means such that the phase of said frequency modulated signal at the timing of said sampling pulse is stabilized.

2. A frequency modulating circuit according to claim 1, wherein said detecting means includes a trapezoidal wave signal generating means supplied with said frequency modulated signal and generating a trapezoidal wave signal, and sampling hold circuit means for sampling said trapezoidal wave signal by said sampling pulse and generating a detected output.

3. A frequency modulating circuit according to claim 2, wherein said correcting means includes adder means for adding the output signal of said clamp circuit means and the detected output of said detecting means.

4. A frequency modulating circuit according to claim 1, wherein said clamp circuit means clamps a sync-tip portion of said video signal to said reference level.

5. A frequency modulating circuit according to claim 4, wherein said sampling pulse is generated within the sync-tip portion.

6. A frequency modulating circuit according to claim 1, wherein said sampling pulse generating means includes a monostable multivibrator triggered by said horizontal synchronizing signal.

* * * * *